June 24, 1952 A. SULGER 2,601,643
ANGLE MEASURING INSTRUMENT
Filed Aug. 18, 1949
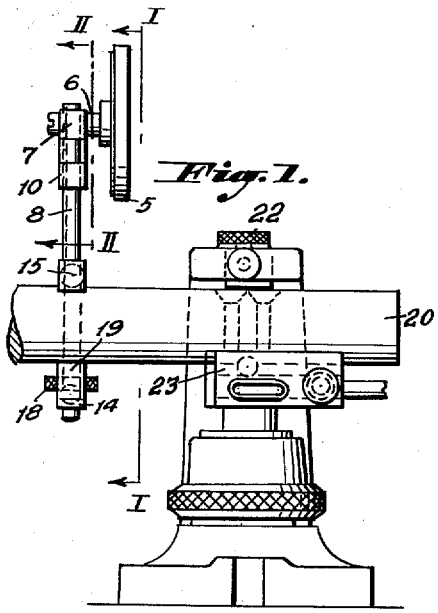
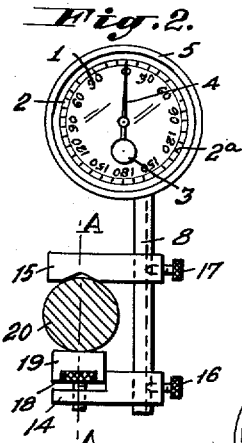
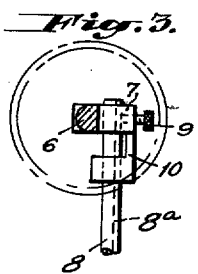
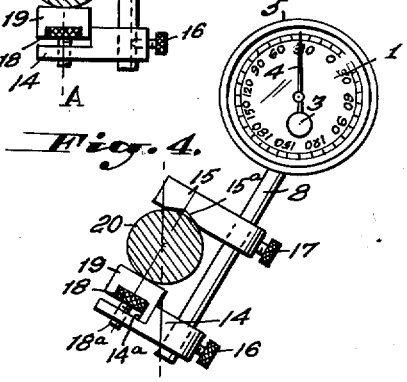
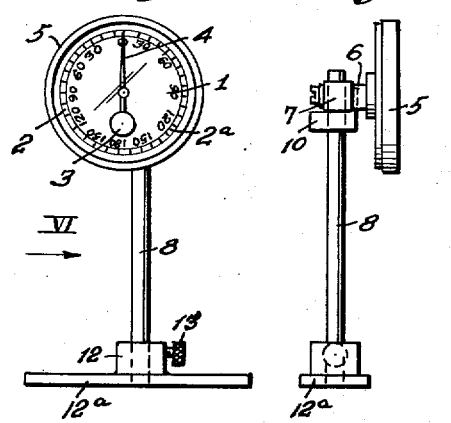
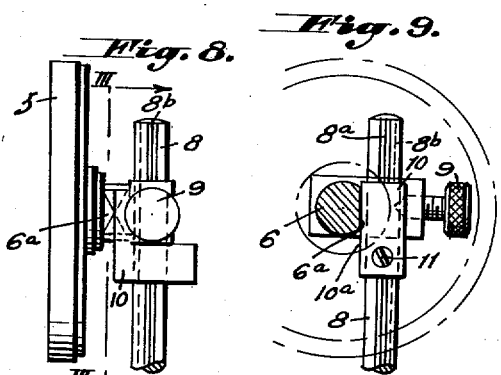
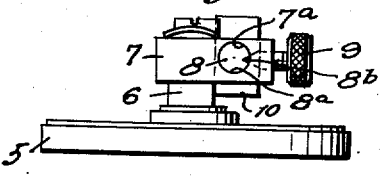
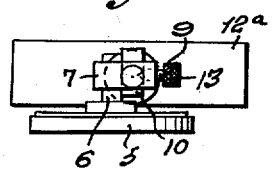
INVENTOR.
Adolf Sulger
BY
Attorneys.

Patented June 24, 1952

2,601,643

UNITED STATES PATENT OFFICE 2,601,643

ANGLE MEASURING INSTRUMENT

Adolf Sulger, Kilchberg, Switzerland

Application August 18, 1949, Serial No. 111,019
In Switzerland August 30, 1948

7 Claims. (Cl. 33—207)

The present invention relates to an angle measuring instrument. More particularly the invention relates to such an instrument of the type provided with a dial having angular degree divisions thereon and a pendulum indicator rotatably cooperating with the dial and in which the instrument is rotatably mounted in a support which can be slipped on a standard in one of two positions 90° displaced from one another. The invention further includes a stop member slidably mountable on and fixable relative to the standard for cooperating with a surface provided on a spindle or a stud member projecting rearwardly of the instrument for locking the instrument from rotation relative to the standard. The invention also comprehends supporting means in the form of a pedestal or base or a clamp mounted on the spindle to support the instrument on a bearing surface or clamp the same to a work piece.

The angle measuring instrument according to the invention can be applied universally; it may be adopted both as inclinometer, say, instead of water levels, and as square and circular dividing apparatus for metal working machines.

The accompanying drawing illustrates by way of example a preferred embodiment of the invention.

Fig. 1 shows a lateral view of the angle measuring instrument in connection with a drilling jig;

Fig. 2 is a sectional view taken on the line I—I of Fig. 1;

Fig. 3 is a partial sectional view taken on the line II—II of Fig. 1;

Fig. 4 represents a sectional view corresponding to Fig. 2, with the instrument in a different position;

Fig. 5 is a front view of the instrument for use as inclinometer in place of liquid levels;

Fig. 6 is a lateral view of the instrument as shown in Fig. 5 seen in the direction of the arrow VI in Fig. 5;

Fig. 7 is a top view of the measuring instrument as shown in Fig. 5;

Fig. 8 shows a detail section on an enlarged scale;

Fig. 9 is a cross-section taken on the line III—III of Fig. 8, and

Fig. 10 is a top view of the detail shown in Fig. 9.

As indicated in the drawings, the dial 1 is provided with measuring scales 2 and 2a each including a measuring range of from zero to 180 angular degrees; pivoted in the center of the face of the dial is a pendulum indicator which is denoted generally at 4 and includes the weight 3. The dial is rigidly connected within a housing 5 and which housing is closed at the front by a transparent face plate constructed, for example, of glass. Projecting rearwardly of the housing 5 is a stud or spindle 6 which is coaxially disposed with respect to the pivot of the indicator or hand 4. This spindle 6 is provided with a flat face 6a for a purpose to be described hereinafter and is rotatably mounted in a transverse aperture in a support member 7. This support member 7 is provided with an additional transverse bore 7a extending at right angles to the aperture or bore receiving the spindle 6 and by means of which the support is slipped over and secured on a standard or spindle 8. This standard constitutes a straight bar of cylindrical cross section and which bar is provided with longitudinally extending parallel grooves 8a and 8b respectively of triangularly cross section and displaced 90° relative to one another. A set screw 9 is threadedly engaged with the support 7 and is provided on its inner end with a point cooperable with either of the grooves 8a or 8b. As indicated in Figures 8 to 10 the set screw 9 is engaged in the longitudinal groove 8b so as to fix the support relative to the spindle or standard so that the support can not rotate with respect thereto. Upon release of the set screw 9 the support 7 together with the instrument can be removed from the standard turned through 90° and replaced thereon and in which position the tip of the set screw engages with the longitudinal groove 8a.

As shown in Figs. 8 and 9, the stud 6 is flatfaced at 6a. A stop member 10 is put onto standard 8, and by means of a screw 11 engaging the longitudinal groove 8a may be fixed in its position thereon and prevented from turning about the standard. In Figs. 8 to 10 the flatface 6a of the axis 6 snugly bears against the jaw 10a of stop 10 so that in this position the housing 5 and the dial 1 as in Fig. 5 are secured against rotation.

In connection with the stop member 10, as indicated in the drawings, the same is of angular or L-shaped cross section. The jaw 10a extending in the same direction as the bore through the member 10 by which the stop member is slid into position on the spindle 8, the arrangement is such that when the support 7 is secured by the set screw 9 engaging in the groove 8b the jaw 10a overlaps the face of the support 7 adjacent the rear face of the housing 5 and the side surface of this jaw 10a engages and abuts against the flat face 6a on the stud 6. When the set screw 9 is loosened and the support 7 together with the instrument is displaced 90° so that the position of the set screw and support are determined by the groove 8a, the relationship shown in Figure 3 exists wherein the support 7 is disposed above and out of engagement with the jaw 10a other than a resting engagement on the top edge of this jaw so that in the position assumed in Figure 3, the stud 6 and the housing 5 are rotatable with respect to the support 7.

As shown in Figs. 5 to 7, a pedestal 12 with an elongated base plate 12a, rectangular in plan, is slipped onto the bottom end of standard 8 and secured thereon by a set screw 13. The direction of the plane of the flatface 6a on stud 6 is so chosen with respect to the dial graduation that the hand 4 exactly points to "0" of the scale, if the instrument with the standard base 12 is placed exactly level. Thus the instrument may be used as an inclinometer in a manner similar to the use of a liquid level.

In order to ascertain whether the bearing surface to be checked is really level the measuring instrument shown in Figs. 5 to 7 is placed on the bearing surface in positions, say, at right angles to each other. If the bearing surface is exactly level, the hand 4 points to "0" of the scale in both measuring positions.

As shown in Figs. 1, 2 and 4, instead of the standard base 12, two spaced holding arms 14 and 15 extending at right angles to the axis of the standard are slipped thereon and adjustably fixed in position by set screws 16 and 17, respectively.

One of the holding arms, 15, is provided with a triangular notch 15a in V-bearing fashion, whilst the other arm, 14, has a set screw 18 threaded therein whose rotary axis lies parallel to the longitudinal axis of the standard. At the side away from the threaded pin 18a the set screw 18 is turnable in a clamping body 19 and securely supported against axial displacement. The clamping body 19 is guided in a recess 14a of the arm 14 and prevented from turning about the axis of the set screw.

In Fig. 1, numeral 20 designates a workpiece in the form of a shaft held in a drilling jig 21 between a drilling bush 22 and a V-bearing 23. Clamped on to the end of shaft 20 (left-side in Fig. 1) is the angle measuring instrument. For holding the instrument on shaft 20, the holding arms 14 and 15 are shifted thereover and fixed in their relative positions as in Fig. 2 by tightening the set screws 16 and 17 on standard 8. Then the screw 18 is turned so as to move outwardly of the holding arm 14, the clamping body 19 being thereby pressed against the shaft 20, and thus the measuring instrument is held tight by friction on shaft 20. Now a hole may be bored in the direction of the axis A—A. If then on shaft 20 another hole, say, displaced by 30°, should be bored, dial 1 is at first by turning the housing 5, so adjusted that the hand points to "0" on the scale as shown in Fig. 2. Thereupon the shaft together with the clamped angle measuring instrument in the drilling jig is turned about its longitudinal axis until the hand 4 points to number 30 of the scale as illustrated in Fig. 4.

In a way similar to that described, holes may be bored at any angle to each other. The field of application of the instrument is not to be confined to use for round shafts and drilling holes, as the angle measuring device may just as well be applied to workpieces of any other shapes, provided these present some part on which to clamp the device. In an analogous way, the device as shown in Figs. 1 to 4 may be adopted for making and working inclined faces of workpieces on planning and milling machines, or else be used as a circular dividing apparatus.

What I claim is:

1. In an instrument of the type having a dial provided with scale markings and a gravity responsive pointer the improvement which comprises a stud member projecting rearwardly of the face of the dial, a support member rotatably receiving said stud member, a standard having position determining means thereon spaced 90° relative to each other for selectively receiving said support in 90° spaced positions, locking means carried by the support and cooperable with the position determining means for selectively locking the support to said standard in said respective 90° spaced positions and a stop member carried by said standard and cooperable with said standard in one of the said 90° spaced positions of the support to prevent rotation of said stud and thereby said dial.

2. In an instrument as defined in and by claim 1 and means removably carried by the standard for supporting the same.

3. In an instrument as defined in and by claim 2 in which said means for supporting the standard comprises a rectangular base plate and clamping means to secure the same to the lower end of the standard.

4. In an instrument as defined in and by claim 1 and clamping means embodying two arms each adjustably fixedly secured to said standard and means carried by each arm and cooperating with said position determining means to maintain the arms in parallelism with each other.

5. In an instrument as defined in and by claim 4 and a clamping block adjustably slidably mounted on one of said arms and means on the said arm constraining said block for sliding movement in a direction transversely of the longitudinal axis of the said arm and toward the other arm in a direction parallel to the longitudinal axis of the standard.

6. In an instrument of the type including a dial having scale markings thereon and a pendulum indicator cooperable with the scale markings, a stud projecting rearwardly of the dial and coaxial with respect thereto, said stud having a flat face thereon, a support member normally rotatably receiving said stud, a standard having spaced parallel grooves extending longitudinally thereof in 90° spaced relation, said support member having a transverse bore for receiving said standard, means carried by the support member and selectively cooperable with the respective grooves to fix the support member from rotation relative to said standard and a stop member adjustably carried by said standard including a flat face cooperable with the flat face on said stud to prevent rotation of said stud and thereby rotation of said dial when said support member is fixed in one of said 90° spaced positions.

7. In an instrument as defined in and by claim 6 wherein said stop member is L-shaped in cross section and includes a jaw extending in parallelism with respect to the axis of said spindle and in overlapping engagement with said support and said jaw extending at right angles with respect to the axis of said stud.

ADOLF SULGER.

REFERENCES CITED

The following references are of record in the file of this patent:

UNITED STATES PATENTS

| Number | Name | Date |
| --- | --- | --- |
| 849,409 | Martin | Apr. 9, 1907 |
| 948,523 | Perkins | Feb. 8, 1910 |
| 1,931,490 | Fisher | Oct. 24, 1933 |
| 1,952,945 | Sawada | Mar. 27, 1934 |
| 2,043,162 | Foster | June 2, 1936 |
| 2,124,006 | Parker | July 19, 1938 |

FOREIGN PATENTS

| Number | Country | Date |
| --- | --- | --- |
| 20,928 | Great Britain | 1907 |